United States Patent [19]

Hartmann et al.

[11] 4,045,869

[45] Sept. 6, 1977

[54] METHOD FOR PRODUCING ELECTRICAL CONNECTOR STRIPS

[75] Inventors: Gunter Hartmann, Munich; Rudolf Winckler, Gauting, both of Germany

[73] Assignee: Siemens Aktiengesellschaft, Berlin & Munich, Germany

[21] Appl. No.: 613,892

[22] Filed: Sept. 16, 1975

[30] Foreign Application Priority Data

Sept. 19, 1974 Germany .................... 2444892

[51] Int. Cl.² .................................... H01R 43/02
[52] U.S. Cl. .................................... 29/630 A; 29/629; 174/52 R; 174/52 PE
[58] Field of Search ................ 29/629, 630 A, 630 B, 29/630 R; 113/119; 174/52 R, 52 PE, 52 FP; 264/272; 339/17 CF, 17 B

[56] References Cited

U.S. PATENT DOCUMENTS

| 3,265,806 | 8/1966 | Burks et al. ............... 174/52 FP |
| 3,544,857 | 12/1970 | Byrne et al. ............. 174/52 FP X |
| 3,627,901 | 12/1971 | Happ ......................... 174/52 PE |
| 3,735,017 | 5/1973 | Manning .................... 174/52 S |

OTHER PUBLICATIONS

Soldering Manual, American Welding Society, May 1964, pp. 25-42.

*Primary Examiner*—Victor A. DiPalma
*Attorney, Agent, or Firm*—Hill, Gross, Simpson, Van Santen, Steadman, Chiara & Simpson

[57] ABSTRACT

A method for producing electrical connector strips which have soldering extensions arranged within an insulating carrier where the strip is formed apart from the insulating carrier and treated with an active deoxidation agent, tinned in the region of the soldering extensions, then placed in the insulating carrier and finally free-cut in such a fashion as to preserve solderability of the extensions.

4 Claims, 5 Drawing Figures

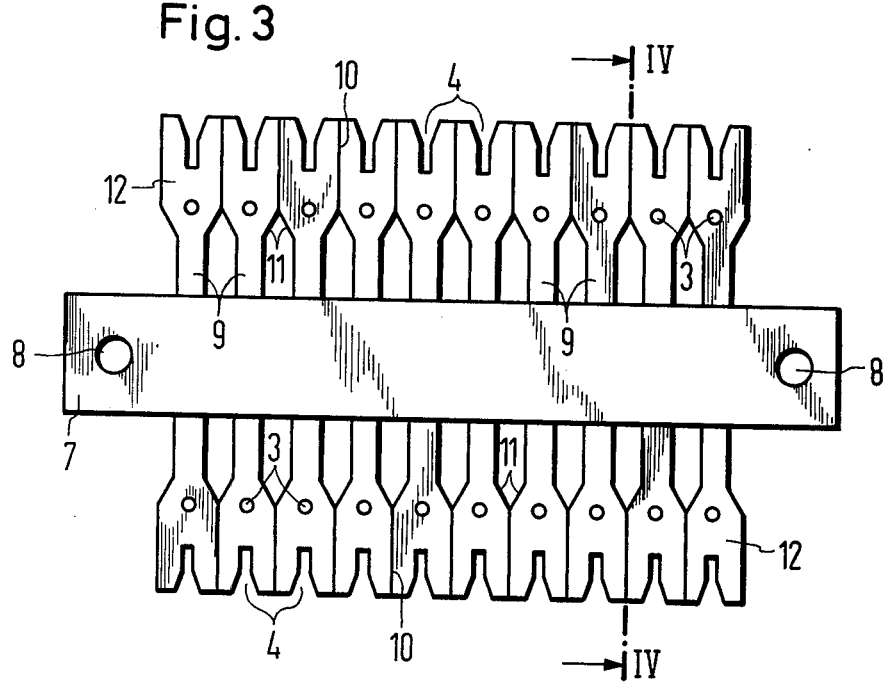
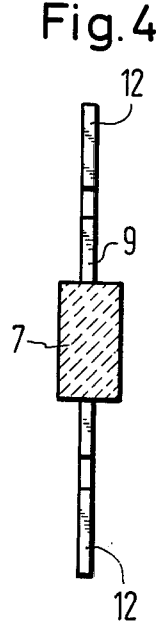
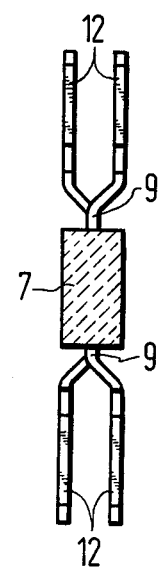

4,045,869

METHOD FOR PRODUCING ELECTRICAL CONNECTOR STRIPS

BACKGROUND OF THE INVENTION

1. Description of the Prior Art

In order to preserve the solderability of the solder extensions of electrical connector strips during prolonged storage, the connector elements have in the past been made of oxidation-resistant metals such as German silver, however these oxidation-resistant materials are quite expensive, and it would be desirable to make such connector extensions from materials such as brass or tin-bronze and subsequently to coat the brass or bronze with tin or a tin-alloy to preserve the solderability of the extensions. However before coating brass or tin-bronze with tin or a tin-alloy, the brass or tin-bronze must be treated with an active cleansing agent. It has been discovered that such agents tend to reside in the capillaries between the connective elements and the insulating carrier with the result that damage can be caused to the device.

2. Field of the Invention

The field of art to which this invention pertains is electrical connector strips and in particular to electrical connector strips having means to prevent a decrease in the solderability of the connective elements during prolonged storage.

SUMMARY OF THE INVENTION

It is an important feature of the present invention to provide an improved method for producing electrical connector strips.

It is an object of the present invention to provide a method for producing electrical connector strips which leaves the strips in such a manner as to preserve the solderability of the strip extension members even after prolonged storage.

It is also an object of the present invention to provide a method for producing an electrical connector strip which includes forming the strip of brass or tin-bronze, treating the strip with an active cleansing agent, and applying a tin or tin-alloy coat to the connective portions of the strip, forming an insulating carrier on the strip, and then free-cutting the strip into separate connective elements.

It is a further object of the present invention to provide an electrical connector strip as described above wherein the soldering extensions are alternately bent in opposite directions to form a staggered row arrangement of such extensions.

These and other objects, features and advantages of the present invention will be understood in greater detail from the following description and the associated drawings wherein reference numerals are utilized to designate a preferred embodiment.

BRIEF DESCRIPTION OF THE DRAWINGS

FIG. 3 shows a soldering lug strip finished except for the bending of the lugs.

FIG. 4 shows a cross section taken along the line IV—IV of FIG. 3.

FIG. 5 shows a cross section similar to FIG. 4 with the soldering lugs bent in staggered relation.

DESCRIPTION OF THE PREFERRED EMBODIMENT

Figure 1:
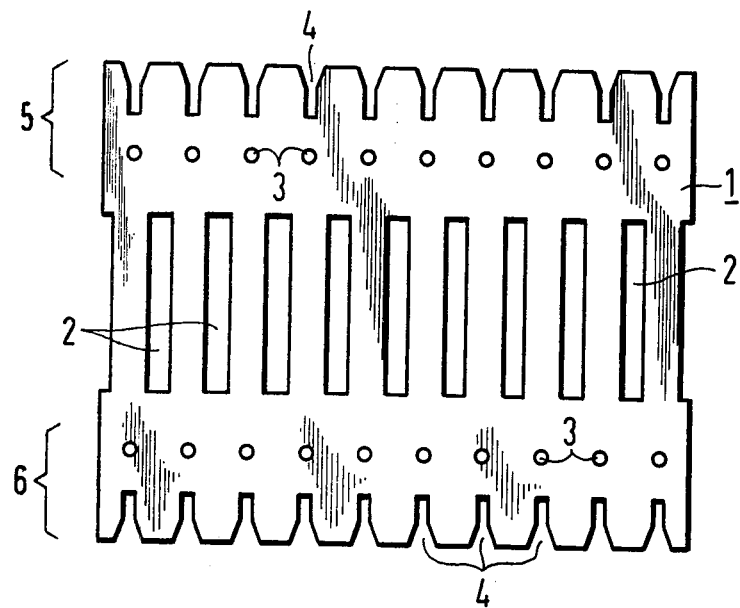
FIG. 1 shows a stamped-out plate bar with connected soldering lugs.

This invention relates to a method for producing electrical connector strips which have soldering extensions which are arranged within an insulating carrier in such a manner that the connector elements take the form of a continuous row linked by a cross-connection. The elements are stamped from a metal strip, fixed in the insulating carrier and separated from one another by a free-cutting step.

It is known to produce soldering connector strips. In addition to soldering lugs, however, other strip connector elements such as relay springs can also be produced. In order to position and space the individual connective elements without subsequent adjustments, the strips are secured in an insulating material carrier before the free-cutting process. To accomplish this, the linked connective elements are sprayed with an insulating material, or mounted into insulating parts of relays and other component parts. Each of the individual connective elements has at least one soldering extension projecting out of the insulating material carrier. This extension is provided with a hole or slit for soldering wires.

In order to obtain reliable soldering connections of the wires, the soldering extensions must have good solderability, particularly in the region of the holes or slits. To guarantee good solderability even after prolonged storage, the connective elements are made of oxidation-resistant metals or metal alloys such as German silver (nickel silver, Argentan). Since these oxidation-resistant materials are very expensive, an attempt was made to make the connective elements out of relatively cheap materials, such as brass or tin-bronze and, in the region of the soldering extensions, to provide them with a firmly adhesive coating of tin or tin-alloys to prevent decreases in solderability after prolonged storage.

Oxidized brass and oxidized tin-bronze, however can only be tinned after pretreatment with active agents. In the process of such pretreatment of the finished soldering extensions, the active agents tend to reside in the capillaries between the connective elements and the insulating material carrier, and thus the danger of subsequent damage arises.

The invention thus has the underlying objective of creating a method by which connective elements arranged in an insulating material carrier can be produced from brass or tin-bronze, while permitting the soldering extensions to have good solderability even after prolonged storage.

This objective is accomplished by the fact that in a method of the type named at the outset, a metal strip of brass or tin-bronze is used, the metal strip after stamping is treated with an active deoxidation agent and tinned in the region of the soldering extension, and in the free-cutting process the cut edges are maintained in such fashion that the solderability of the extensions is not impaired.

During the stamping of the metal strips the soldering extensions receive their ultimate form, at least in the region of the holes or slits. The cut edges of the holes or slits which are vital for good solderability, are then tinned in a subsequent tinning operation with the end result that the solderability of the soldering extensions is guaranteed even after prolonged storage times. Since the cut edges which come about during free-cutting are untinned, they are placed in regions in which the solderability of the soldering extensions is not impaired. Subsequent damage because of active deoxidation agents does not occur in connection with the inventive method, since deoxidation agents can easily be completely removed before the fixing of the connective elements in the insulating material carrier. The individual steps of the inventive method can be incorporated into an automated manufacturing process without difficulty. In the manufacturing process, depending on whether the metal strips are unrolled from a belt or inserted in the form of plate bars, the production of the connective elements takes place either continuously or intermittently.

Preferably before tinning, a flux agent is applied to the metal strip. Especially in connection with the use of active flux agents, the wetting of the soldering extensions during tinning is hereby further improved. Subsequent damage does not come about because of the use of active flux agents, since any possible remnants can be easily removed after tinning.

In a preferred embodiment of the inventive method the cut edges are formed immediately between the soldering extensions during free-cutting and the soldering extensions are alternately bent forward and back in a staggered relation after free-cutting. The untinned cut edges thus form the lateral edges of the soldering extensions, which lateral edges are not vital to good solderability. By bending the soldering extensions forward and back, two connective rows are created whereby the intervals between the individual soldering connections are so great that no short circuits can occur.

In the following, a preferred embodiment of the inventive process is explained in more detail.

According to FIG. 1 in the production of a soldering lug strip with soldering lugs of brass, the starting point is a plate 1, from which, with the help of an appropriate combination tool, a series of rectangular-shaped recesses 2, as well as holes 3 and slits 4, are stamped or, respectively, free-cut. Subsequently, the plate 1 is washed and treated with an active flux agent, the external edges 5 and 6 of the plate 2 are tinned, and the holes 3, as well as the slits 4, are freed of excess tin by brushing.

Figure 2:
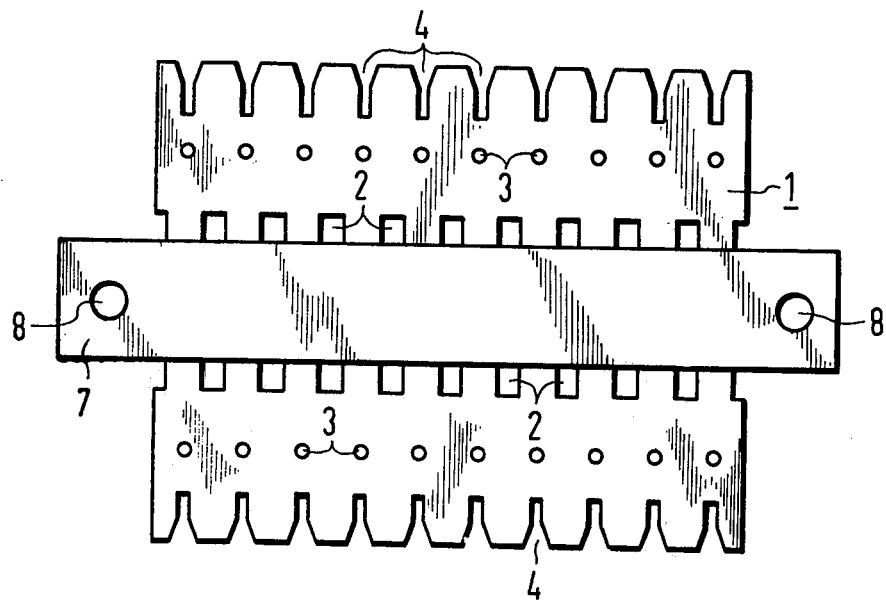
FIG. 2 shows the plate bar of FIG. 1 after spraying with an insulating material.

As can be seen from FIG. 2, the plate 2 is subsequently arranged in an insulating material carrier 7, which is produced by spraying the plate 2 with insulating material. The spraying form is fashioned in such a way that fastening holes 8 are simultaneously formed in the insulating carrier 7.

According to FIG. 3 the plate 2 is, after spraying, divided by free-cutting into a series of soldering lugs 9. The untinned cut edges 10 and 11, which are produced by free-cutting, form the lateral edges of soldering extensions 12 of the individual soldering lugs 9. The solderability of the soldering extensions 12 which must be guaranteed in the regions of the holes 3 and slits 4 is not impaired by the untinned cut edges 10 and 11.

FIG. 4 shows a cross section taken along line IV—IV of FIG. 3. From this it can be seen that the soldering lugs 9 with their extensions 12, are located in one plane after the free-cutting. To complete the soldering lug strip, the soldering extensions 12 are alternately bent ahead and back relative to the plane of the lugs 9 with the result that two connective rows are produced as is shown in the cross section of FIG. 5. The free-cutting and bending of the soldering extensions 12 can also be undertaken simultaneously with the help of an appropriate combination tool. In the production of the soldering lug strips with soldering lugs of brass the material costs, vis-a-vis soldering lugs made of German silver, were reduced by approximately 40%.

We claim:

1. A method for producing an electrical connector strip comprising the steps of:
   providing a thin planar strip of metal from the group consisting of brass or tin-bronze,
   partially cutting the strip to form critical edges thereby,
   treating the thereby formed thin planar strip with a strong deoxidation agent,
   tinning only those selected portions containing said critical edges of the connector strip to which solder connections are to be made,
   affixing an insulation carrier to the strip,
   and free-cutting the strip at non-critical edges to form a plurality of connector elements to preserve the solderability of the tinner portions.

2. A method in accordance with claim 1 including the step of applying a flux agent to the connector strip prior to tinning.

3. A method in accordance with claim 2 wherein an active deoxidation flux is used as said flux agent.

4. A method in accordance with claim 1 wherein the thin planar connector strip is formed to have a plurality of soldering extensions lying parallel to each other and wherein said free-cutting is performed intermediate of adjacent ones of said extensions, and further including the step of bending alternate ones of the soldering extensions in a staggered relation with respect to the plane of said connector strip.

* * * * *